(12) United States Patent  (10) Patent No.: US 7,454,825 B2
Magdy  (45) Date of Patent: Nov. 25, 2008

(54) METHOD OF MANUFACTURING THIN-WALLED STRUCTURES

(75) Inventor: Terry Magdy, Hammonds Plains (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 613 days.

(21) Appl. No.: 11/117,473

(22) Filed: Apr. 29, 2005

(65) Prior Publication Data

US 2006/0242816 A1   Nov. 2, 2006

(51) Int. Cl.
B23P 17/00 (2006.01)
(52) U.S. Cl. ........................................... 29/424
(58) Field of Classification Search ............... 29/424, 29/527.2, 897.3, 897, 895, 423; 82/1.11, 82/168; 269/7; 492/57
See application file for complete search history.

(56) References Cited

U.S. PATENT DOCUMENTS

| | | | |
|---|---|---|---|
| 3,672,032 A | 6/1972 | Witherspoon | |
| 3,790,152 A | 2/1974 | Parsons | |
| 3,921,343 A | 11/1975 | Speyer | |
| 3,953,013 A | 4/1976 | Griffith et al. | |
| 4,339,867 A | 7/1982 | Reznik | |
| 4,509,673 A | 4/1985 | Schmidt et al. | |
| 4,629,378 A | 12/1986 | Parsons | |
| 4,729,804 A | 3/1988 | Dillner | |
| 4,730,382 A | 3/1988 | Parsons | |
| 4,822,013 A | 4/1989 | Johnson | |
| 5,013,014 A | 5/1991 | Mushardt | |
| 5,079,821 A | 1/1992 | Parsons | |
| 5,127,780 A | 7/1992 | Massa | |
| 5,138,918 A | 8/1992 | Attardi et al. | |
| 5,210,926 A | 5/1993 | Newton | |
| 5,826,866 A | 10/1998 | Becker et al. | |
| 5,947,662 A | 9/1999 | Becker et al. | |
| 6,647,611 B2 | 11/2003 | Zhang | |

FOREIGN PATENT DOCUMENTS

EP   1 356 892   10/2003

*Primary Examiner*—John C Hong
(74) *Attorney, Agent, or Firm*—Ogilvy Renault LLP

(57) ABSTRACT

A method of manufacturing a thin wall structure involves reinforcing the thin wall structure with a meltable matrix to resist the stresses induced in the structure during machining.

16 Claims, 4 Drawing Sheets

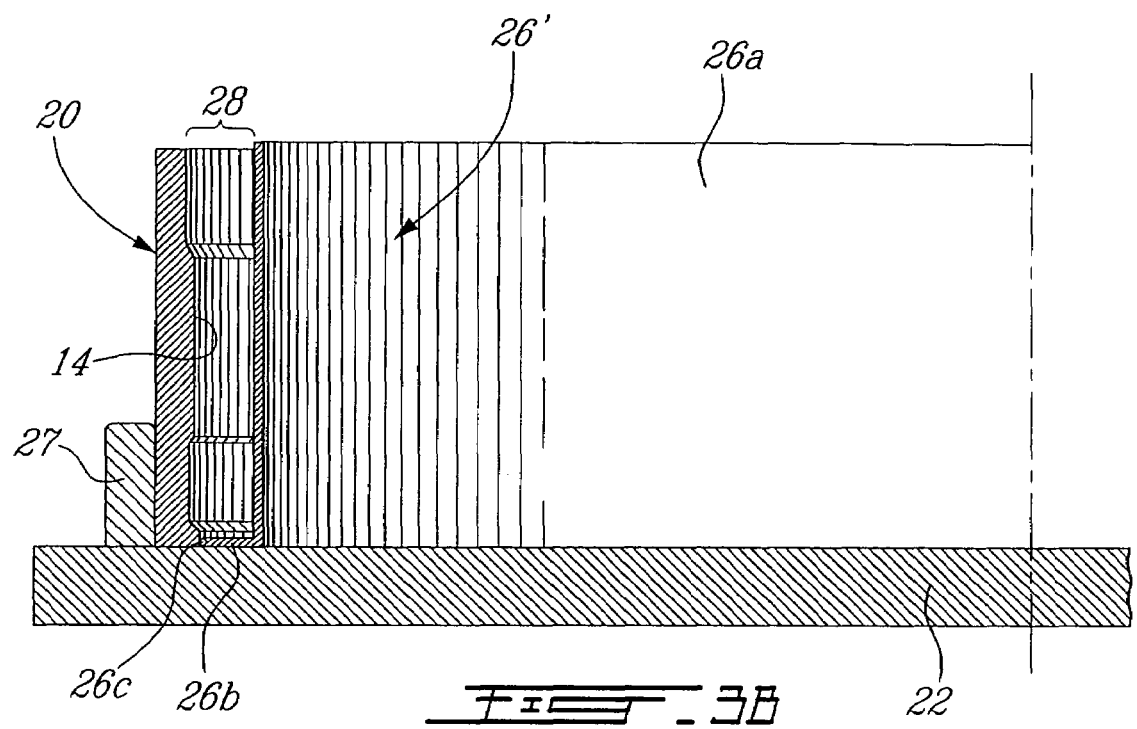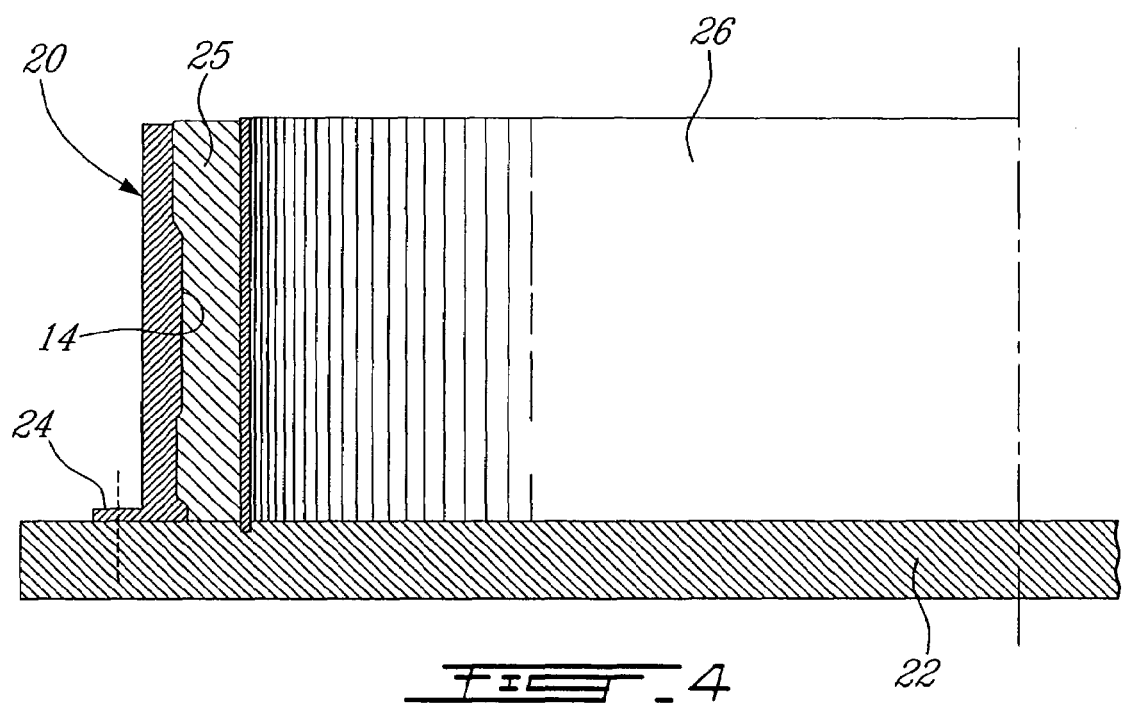

METHOD OF MANUFACTURING THIN-WALLED STRUCTURES

TECHNICAL FIELD

The invention relates generally to thin-walled structures and, more particularly, to a method of machining such thin-walled structures.

BACKGROUND OF THE ART

Due to machining and/or design constraints, thin wall structures, such as turbine support baffles, are typically constructed of formed sheet metal and often involves welding to other reinforcing structures. This process is time consuming, labour intensive and expensive. Furthermore, welding involves high temperature materials that directly affect the properties of alloys. As a result heat treatments are typically conducted after any welding operation to re-establish the alloy metallurgical properties. Welded thin-walled structures sometimes have to be thickened to account for mismatch which leads to weight increases which can be critical to engine performance. Inherently, welds are sources of increased stress. Removal of unnecessary welds can increase part life.

Accordingly, there is a need to provide a new thin wall machining method which does not involves any welding operations.

SUMMARY OF THE INVENTION

It is therefore an object of this invention to provide an improved method of machining thin wall structures.

In one aspect, the present invention provides a method of machining a thin wall structure, comprising the steps of: a) positioning a dam member in spaced-apart facing relationship with a first surface of the thin wall structure opposite to a second surface thereof to be machined, the dam member and the first surface of the thin wall structure defining a gap extending over substantially the entire area to be machined; b) substantially filling said gap with a meltable material, once set, the meltable material providing a backing to said second surface to be machined, c) performing a first machining operation on the second surface of the thin wall structure, and d) separating the thin wall structure from the meltable material.

In another aspect, the present invention provides a method of manufacturing a thin-walled cylindrical workpiece, comprising the steps of: providing a substantially cylindrical blank having a circumferentially extending wall having a thickness defined between an inner cylindrical wall surface and an outer cylindrical wall surface; temporarily increasing the thickness of said circumferentially extending wall by lining one of said inner and outer cylindrical wall surfaces with a meltable matrix backing, once set, the meltable matrix backing providing a continuous cylindrical support to said circumferentially extending wall, performing a first machining operation on said inner or outer cylindrical wall surface opposite the surface lined with said meltable matrix backing, and separating the blank from the meltable matrix backing.

Further details of these and other aspects of the present invention will be apparent from the detailed description and figures included below.

DESCRIPTION OF THE DRAWINGS

Reference is now made to the accompanying figures depicting aspects of the present invention, in which:

FIGS. 2 to 6 are cross-sectional views illustrating the machining process of the turbine support baffle shown in FIG. 1.

DETAILED DESCRIPTION OF THE PREFERRED EMBODIMENTS

Turbine support baffles used in gas turbine engines are a thin walled cylindrically shaped part typically designed with two Inconel forged rings welded to opposed ends of a cylinder that has been formed and welded from an Inconel sheet metal strip (0.030"-0.040" thickness). The rings and the sheet metal are typically assembled, welded and machined to final form with stress relieving operations at each step. Air cooling holes are machined at the final operation, which is typically performed using laser or EMD method due to the thin-wall of the sheet metal.

Figure 1:
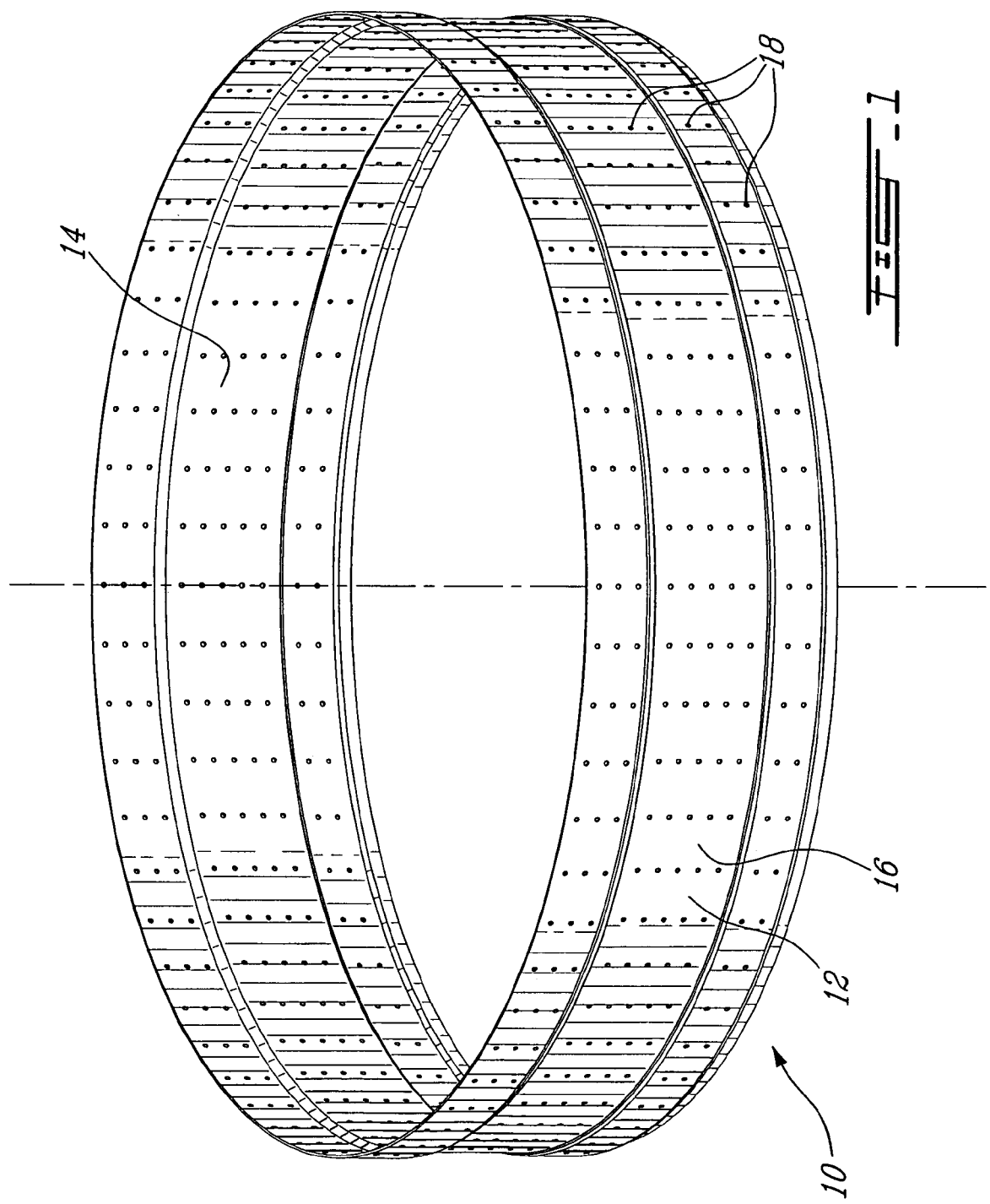
FIG. 1 is a perspective view of a monolithic turbine support baffle in accordance with a preferred embodiment of the present invention.

As opposed to the above-described conventional turbine support baffles, FIG. 1 shows a turbine support baffle 10, which is of monolithic construction. The baffle 10 has a thin circumferentially extending wall 12 having inner and outer surfaces 14 and 16. The inner surface 14 has an inside diameter (ID) profile. Likewise, the outer surface 16 has an outside diameter (OD) profile. Air holes 18 extend thicknesswise through thin wall 12.

Figure 2:
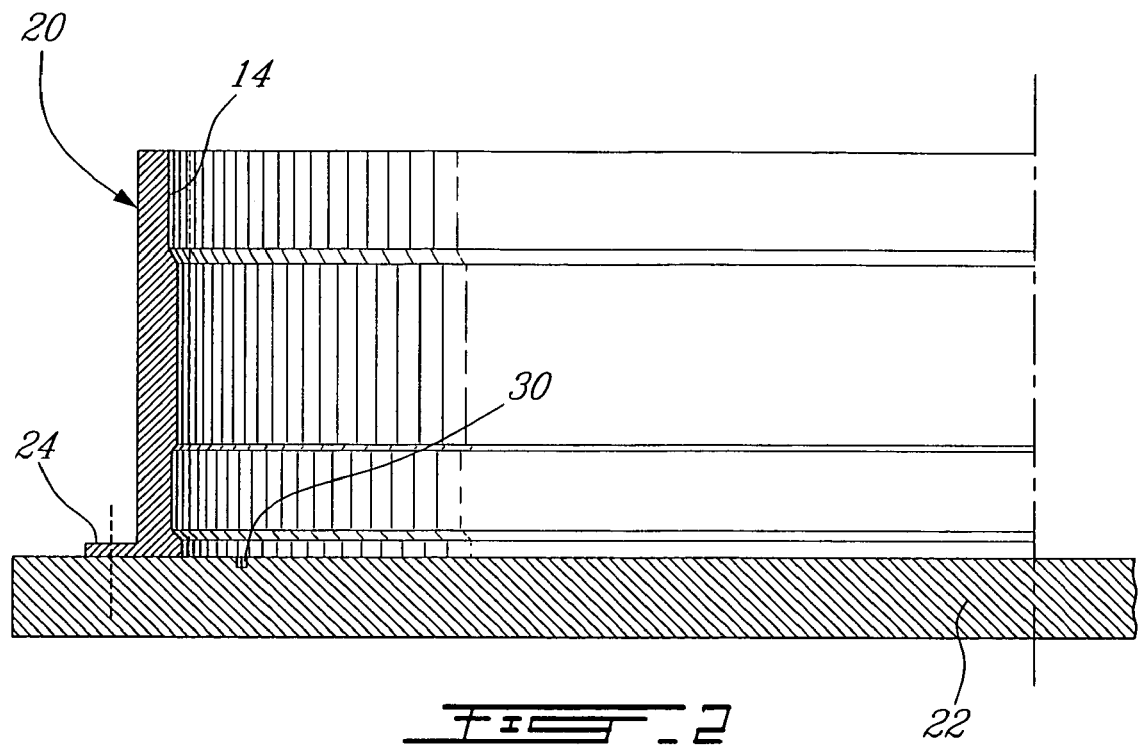

As shown in FIG. 2, the baffle 12 can be machined from a single forged blank 20 roughly sized to the finished component with machining stock allowance. The blank 20 is secured to a vertical lathe fixture 22, for instance through a bottom flange 24 thereof, and the entire ID profile of the baffle 10 is turned. It is understood that initial thickness of the cylindrical wall of the blank 20 is sufficient to withstand the stresses induced in the blank 20 during the machining of the ID profile. However, after the machining of the ID profile, the wall of the blank 20 need to be reinforced before proceeding with the turning of the OD profile.

Figure 3A:
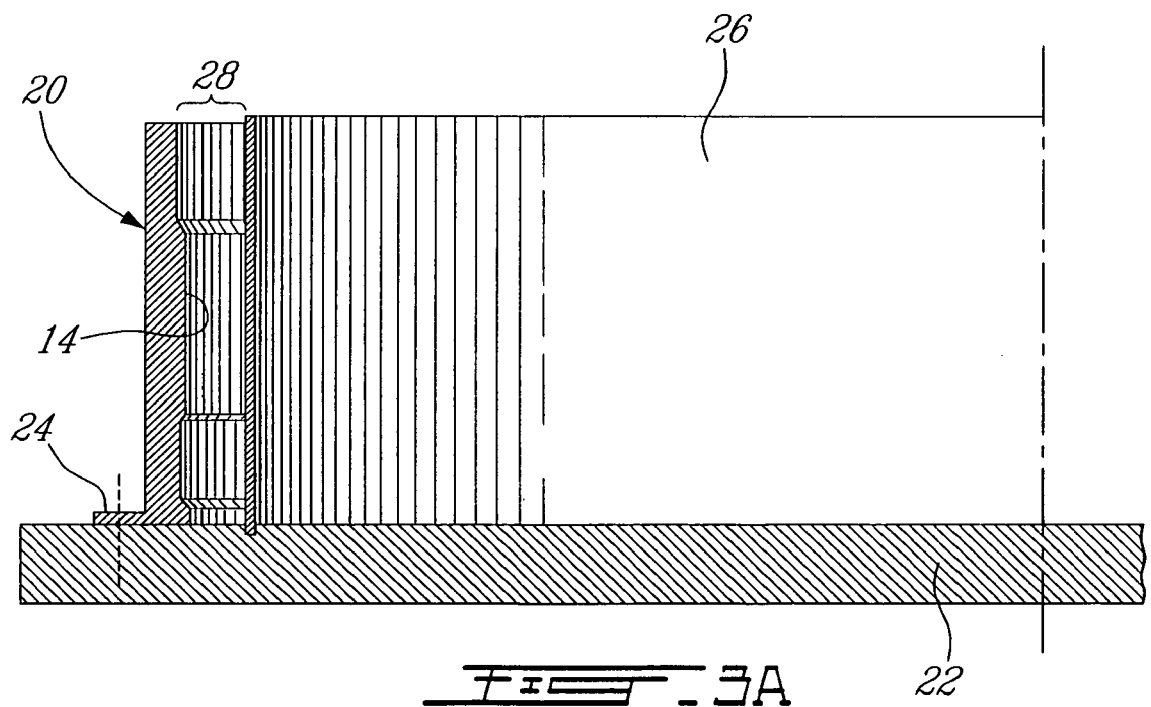

This could be done by filling the entire cavity circumscribed by the blank 20 with a meltable matrix material 25 (see FIG. 4). However, a dam member 26 is preferably mounted within the blank 20 in spaced-apart relationship to the inner surface 14. As shown in FIG. 3a, the dam member 26 can be provided in the form of a continuous ring. The outer diameter of the dam member 26 is smaller than the inner diameter of the blank 20 and is concentrically mounted therewithin to provide for the formation of a continuous annular gap 28 between the dam member 26 and the blank 20. The distance between the dam member 26 and the blank 20 is selected to permit pouring of a sufficient amount of meltable matrix material to support the stresses induced in the blank 20 during machining of the outer surface thereof. Axially, the dam member 26 is preferably at least as long as the blank 20 to ensure that the surface to be machined has adequate backing over the entire area thereof. The dam member 26 can be secured to the blank 20 itself or can be fitted to a groove 30 or shoulder machined in the fixture 22, as exemplified in FIG. 3a.

As shown in FIG. 3b, the dam member 26' could have an open top hat configuration with a bottom annular flange 26b and an optional hi-temperature silicone o-ring 26c. The flange 26b can be welded to the bottom end of the cylindrical part of the dam 26'. This arrangement could be used to a form a seal directly to the part itself without having to seal the dam to the fixture 22. This would be useful where it is impractical to seal the dam to the fixture because of the fixture configuration or when the parts need to be separated from the fixture for melt out. It is also advantageous when needs to be filled off fixture/machine. One advantage is that cooling and melt-out time is out of cycle time.

The o-ring 26c provides a more "watertight" seal and can also be used to provide sealing on irregular surfaces. Chucks 27 can be used to secure the workpiece in position on the fixture 22.

The dam member 26 provides several benefits. It reduces usage of meltable matrix material 25 in larger parts, reducing waste, while providing faster cooling of the matrix material 25 to fix the part and faster melting for disassembly. It also ensures a balanced assembly which is important to the turning process.

After the dam member 26 has been installed, the gap 28 is filled with melted matrix material 25 and allowed to set and cool, as shown in FIG. 4. If possible in the process, the meltable matrix material tank (not shown) can be positioned local to the lathe to allow filling of the meltable material directly into the fixture 22 without removing the setup. The meltable matrix material 25 is preferably provided in the form of low melt alloys, such as Cerralow, MC148, Tin-Bismuth Alloys, etc. The alloy is preferably selected to have zero or slight expansion properties upon cooling to produce a positive backing on the wall structure being machined.

Evenly distributed filling and cooling of the meltable matrix is desirable to provide consistent results. This can be achieved by rotating the part/ring on a turntable while filling. The part/dam and fixture can be mounted and centered on a turn table that can be raised and lowered underneath the fill spout of the melt pot with the assembly properly centered with the spout inside the annular gap 28. The matrix can be filled while rotating the assembly at a rate that achieves even fill around the circumference. Alternatively, a melting unit with a heated hose could be used to allow for remote filling. This could allow for filling of the assembly directly on a vertical lathe utilizing its turn table to achieve the same functionality.

Figure 5:
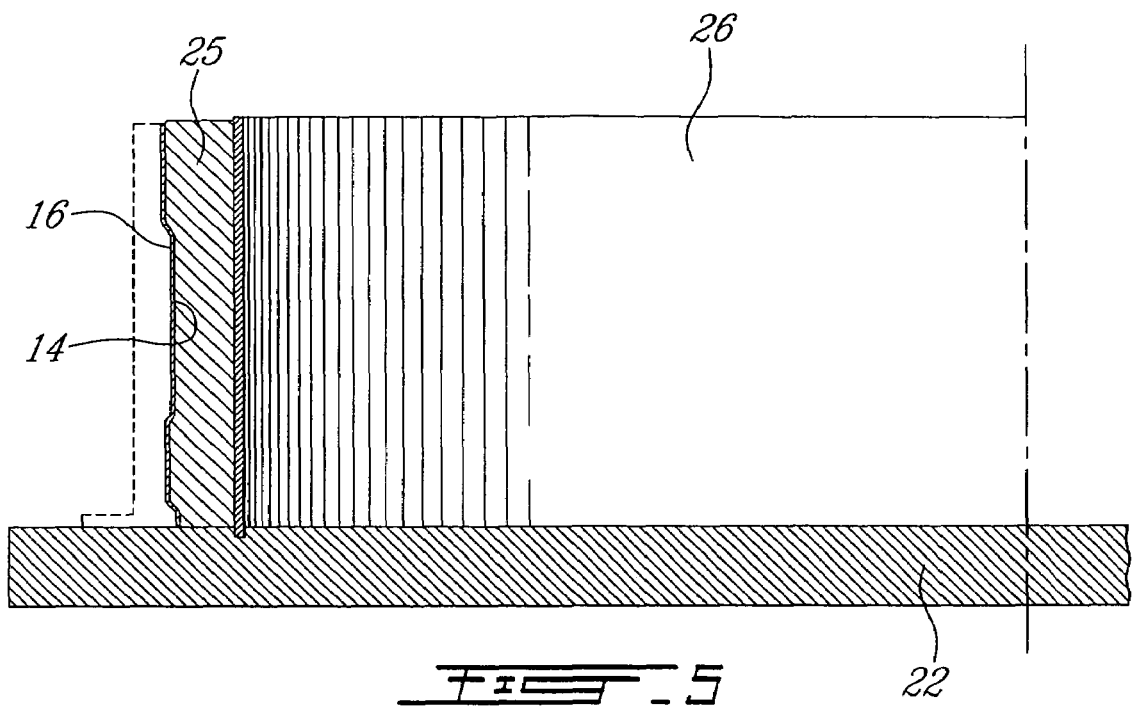

In its solidified state, the meltable matrix material 25 provides a continuous annular backing to the entire outer surface of the blank 20. The meltable matrix material 25 provides a solid structure to backup the subsequent machining operations and also has the added advantage of producing a beneficial dampening effect for the machining process. The OD profile can then be machined down to finished dimensions with the matrix material 25 providing support against the force of machining, as show in FIG. 5. The OD profile can be machined by turning or other means to its finished dimensions. The meltable matrix backing permits machining to thickness as little as 0.010". With proper design of the fixture 22, the blank 20 can be parted in this operation from the excess forging used to chuck the blank 20. The profiled blank can be separated using a standard parting tool (not shown) without moving as the blank 20 is held firmly in place by the meltable matrix material.

Once the OD profile has been machined, the blank and meltable matrix backing assembly can be transferred as a single unit to a milling fixture 22' (FIG. 6) to provide for the machining of the air holes 18 through the wall of the blank 20. Alternatively, when processed on mill-turn work-centers this can be performed on the same fixture and operation. According to an embodiment of the present invention, this operation involves the micro-drilling of a plurality of cooling air holes 18 around the periphery of the blank 20. During the drilling process, the blank 20 is supported over its entire area by the backing so that local distortions in the blank 20 due to the milling cutter induced loads do not occur. The added stability afforded by the meltable matrix backing and the damping effect thereof contribute to prevent the rupture of the blank wall during the drilling process.

Figure 6:
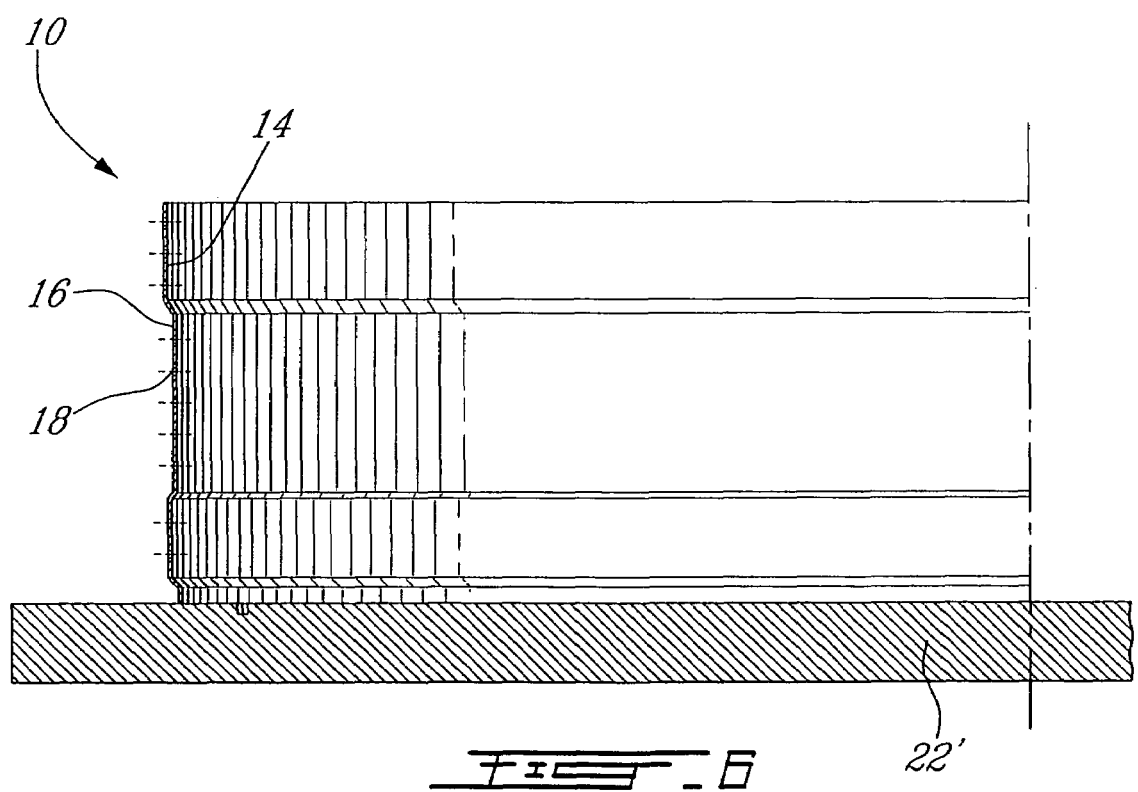

As shown in FIG. 6, the finished product, namely the turbine support baffle 10, may now be removed from the meltable matrix material 25 by simply melting it away. This can be achieved in several ways: 1) submerging in a hot oil or water bath, 2) submerging in a bath of the meltable material itself; or 3) through the use of melt out furnaces, radiant heater or steam.

While the present invention has been described in the context of a turbine support baffle machining process, it is understood that the present method could be used for making a wide variety of products, including various gas turbine engine thin-walled workpiece, such as turbine support cases. It could also be used as a weight reduction method in cast or forged parts where process or design limits minimum wall thicknesses.

The above described manufacturing process advantageously allows the design of monolithic structures from what previously required 2 or more detail parts to produce using conventional welded constructions. It eliminates previously required welding and heat treatment operations. This contributes to reduce the manufacturing time and costs. It results in the production of integral thin wall parts, to a thinness and precision not heretofore possible, and with the consequent advantages of light weight with great strength and resistance to failure.

The above description is meant to be exemplary only, and one skilled in the art will recognize that changes may be made to the embodiments described without department from the scope of the invention disclosed. For example, the OD profile can be first machined and the backing applied thereover to backup the subsequent machining of the ID profile. In that case, the dam member 26 would be positioned about the blank 20. Still other modifications which fall within the scope of the present invention will be apparent to those skilled in the art, in light of a review of this disclosure, and such modifications are intended to fall within the appended claims.

The invention claimed is:

1. A method of machining a thin wall structure, comprising the steps of: a) fixedly mounting the thin wall structure on a first fixture of a machining tool, b) positioning a dam member in spaced-apart facing relationship with a first surface of the thin wall structure opposite to a second surface thereof to be machined, the dam member and the first surface of the thin wall structure defining a gap extending over substantially the entire area to be machined, the thin wall structure being fixedly held on the first fixture independently of the dam member; c) substantially filling said gap with a meltable material, once set, the meltable material providing a backing to said second surface to be machined, d performing a first machining operation on the second surface of the thin wall structure, and e) separating the thin wall structure from the meltable material.

2. The method as defined in claim 1, comprising the steps of performing different machining operations on the thin wall structure.

3. The method as defined in claim 2, wherein the different machining operations comprises turning and drilling operations.

4. The method as defined in claim 3, wherein said first machining operation comprises performing a turning operation on said thin wall structure, and wherein a second machining operation comprises making a drilling operation on said thin wall structure.

5. The method as defined in claim 1, further comprising the step of removing the thin wall structure and the backing as a one piece unit from the first fixture and installing said one piece unit on a second fixture, and performing a second machining operation on said thin wall structure.

6. The method as defined in claim 1, further comprising the step of: performing a preliminary machining operation on said first surface of said thin wall structure before step b), the preliminary and first machining operations being both performed while the thin wall structure is being held on the first fixture.

7. The method as defined in claim 6, wherein the preliminary machining operation comprises the step of turning an inner diameter (ID) profile or an outer diameter (OD) profile, and wherein step d) comprises the step of turning the other one of said ID profile and said OD profile.

8. The method as defined in claim 1, comprising the step of drilling holes thicknesswise though the thin wall structure while the thin wall structure is supported by said backing.

9. The method as defined in claim 1, wherein the dam member has a bottom annular flange, and wherein the method further comprises step of sealingly engaging the bottom annular flange of the dam member with said thin wall structure before filling said gap with the meltable material.

10. A method of manufacturing a thin-walled cylindrical workpiece, comprising the steps of: providing a substantially cylindrical blank having a circumferentially extending wall having a thickness defined between an inner cylindrical wall surface and an outer cylindrical wall surface; rigidly securing the blank to a first fixture of a lathe, a ring dam being disposed in spaced-apart facing relationship with one of the inner and outer cylindrical wall surfaces to form an annular gap, the blank being held on the first fixture independently of the ring dam; temporarily increasing the thickness of said circumferentially extending wall by pouring a meltable matrix backing into the annular gap, once set, the meltable matrix backing providing a continuous cylindrical support to said circumferentially extending wall; performing a first machining operation on said inner or outer cylindrical wall surface opposite the surface lined with said meltable matrix backing, and separating the blank from the meltable matrix backing.

11. The method as defined in claim 10, wherein the machining step comprises a turning operation.

12. The method as defined in claim 10, wherein the first machining operation is carried on the first fixture, and wherein a the method further comprises the steps of: removing the cylindrical blank and the backing as a one piece unit from the first fixture, installing said one piece unit on a second fixture, and performing a second machining operation on said cylindrical blank.

13. The method as defined in claim 12, wherein said first machining operation comprises performing a turning operation on said cylindrical blank, and wherein said second machining operation comprises making holes through said circumferentially extending wall of said cylindrical blank.

14. The method as defined in claim 10, further comprising the step of performing a preliminary machining operation on said inner cylindrical wall surface before lining said inner cylindrical wall surface with said meltable matrix backing, the preliminary and first machining operations being both performed in a same setup.

15. The method as defined in claim 14, wherein the preliminary and first machining operations respectively comprises the step of turning an inner diameter (ID) profile and an outer diameter (OD) profile.

16. The method as defined in claim 10, comprising the step of drilling holes thicknesswise through the circumferentially extending wall while the cylindrical blank is supported by said backing.

* * * * *